US012643978B2

(12) United States Patent
Li et al.

(10) Patent No.: US 12,643,978 B2
(45) Date of Patent: Jun. 2, 2026

(54) HYPERBRANCHED POLYBENZENE, PREPARATION METHOD AND USE THEREOF

(71) Applicant: SOOCHOW UNIVERSITY, Suzhou (CN)

(72) Inventors: Hongkun Li, Suzhou (CN); Lu Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 578 days.

(21) Appl. No.: 18/196,974

(22) Filed: May 12, 2023

(65) Prior Publication Data

US 2024/0018299 A1 Jan. 18, 2024

Related U.S. Application Data

(63) Continuation of application No. PCT/CN2022/122045, filed on Sep. 28, 2022.

(30) Foreign Application Priority Data

May 25, 2022 (CN) ......................... 202210575165.6

(51) Int. Cl.
*C08G 61/10* (2006.01)

(52) U.S. Cl.
CPC ....... *C08G 61/10* (2013.01); *C08G 2261/132* (2013.01); *C08G 2261/312* (2013.01); *C08G 2261/3142* (2013.01)

(58) Field of Classification Search
CPC .............. C08G 61/10; C08G 2261/132; C08G 2261/312; C08G 2261/3142
See application file for complete search history.

(56) References Cited

U.S. PATENT DOCUMENTS 5,594,058 A * 1/1997 Olsen .................... C08F 238/00 524/483
2010/0159347 A1 6/2010 Choi et al.
2011/0033773 A1 2/2011 Chang et al.

FOREIGN PATENT DOCUMENTS

CN 101220137 A 7/2008
CN 101792531 A 8/2010
(Continued)

OTHER PUBLICATIONS

Bracke et al., J. of Polym. Sci, Part A-1, vol. 10, 2097-2101 (1972).*

*Primary Examiner* — Shane Fang
(74) *Attorney, Agent, or Firm* — SZDC Law PC

(57) ABSTRACT

The invention provides a hyperbranched polybenzene, preparation method and use thereof. The method includes: under an inert gas atmosphere, a monomer with two internal acetylenyl groups undergoes polymerization reaction in a solvent in the presence of a catalyst to obtain the hyperbranched polybenzene. The monomer in the polymerization reaction is a monomer with internal acetylenyl groups, and the catalyst is a nonmetallic catalyst p-toluenesulfonic acid. The polymerization reaction has simple conditions, is convenient and environmentally friendly, and overcomes the problem that the catalyst residue caused by the use of metal catalyst in conventional cyclotrimerization reaction, which affects the polymer properties. Due to the typical aggregation-induced emission (AIE)-active tetraphenyl ethylene units, the tetraphenylethylene-containing hyperbranched polymers of the present invention has high fluorescence quantum yields in the aggregation state and has fully conjugated structures. The hyperbranched polybenzenes can be used as chemical sensors and have an application prospect for polymer light-emitting diodes.

7 Claims, 5 Drawing Sheets

(56) References Cited

FOREIGN PATENT DOCUMENTS

| | | | |
|---|---|---|---|
| CN | 109438720 | A | 3/2019 |
| CN | 114957692 | A | 8/2022 |

* cited by examiner

HYPERBRANCHED POLYBENZENE, PREPARATION METHOD AND USE THEREOF

This application is a Continuation Application of PCT/CN2022/122045, filed on Sep. 28, 2022, which claims priority to Chinese Patent Application No. 202210575165.6, filed on May 25, 2022, which is incorporated by reference for all purposes as if fully set forth herein.

FIELD OF THE INVENTION

The present invention relates to the technical field of polymers, and particularly to a hyperbranched polybenzene, preparation method and use thereof.

DESCRIPTION OF THE RELATED ART

Hyperbranched polymers are a kind of multifunctional macromolecules with dendritic structure. Their unique structures and physical and chemical properties make them have wide application prospects in the fields such as chemical sensing, supramolecular assembly, gene delivery and biomedicine. A commonly used scheme for synthesizing a hyperbranched polymer is self-condensation of $AB_n$-type (n≥2) monomer. However, such a monomer is difficult to prepare, and is likely to self-polymerize during storage, limiting the use of this scheme. Other synthetic methods, such as $A_2+B_n$ (n≥3) polymerization, requires the strict control of the stoichiometric ratio of monomers, otherwise, oligomers are easily formed. Therefore, developing new polymerization reactions to efficiently prepare hyperbranched polymers is of important research significance and application value.

Acetylene [2+2+2] cyclotrimerization is a kind of reaction with high atomic economy. Polymer chemists tried to use such a reaction for polymerization, and developed a novel method to prepare hyperbranched polymers based on cyclotrimerization of $A_n$ (n≥2) monomers. Tang's research group prepared a series of functional hyperbranched polybenzene by cyclotrimerization of alkyne (Chem. Rev. 2009, 109, 5799-5867). Most of the above polymerization reactions are catalyzed by transition metals, such as palladium, ruthenium, cobalt, nickel, and rhodium. However, such metal catalysts are expensive, and the residual metal catalyst affects the properties of polymers, greatly limiting the application range of polymers. In addition, the currently reported cyclotrimerization of monomers with acetylenyl groups mainly uses monomers with terminal acetylenyl groups, while there are few reports on the preparation of hyperbranched polybenzene based on cyclotrimerization of monomers with internal acetylenyl groups. Recently, rhodium-catalyzed cyclotrimerization of phenylpropyneate monomers has been reported (Patent 202110687392.3; Macromolecules 2022, 55, 2456-2462). However, due to the need to use a metal catalyst and activated monomers with internal acetylenyl groups, the application of this polymerization is limited.

Conventional organic and polymer light-emitting materials emit light strongly in a solution, but emit light weakly or not emit light in the aggregated state or solid state, limiting the use of such materials in the solid state. In 2001, Tang's research group of Hong Kong University of Science and Technology reported a novel photophysical phenomenon—aggregation-induced emission (AIE), which is a kind of phenomenon in which luminescent molecules has no light emission or weak light emission in solution and has enhanced light emission in the aggregated state (Chem. Commun. 2001, 1740-1741). Materials with AIE properties have been widely used in the fields such as display, chemical detection, and biosensing (Chem. Rev. 2015, 115, 11718-11940). There are fewer reports on hyperbranched polymers with AIE activity than those on small molecular compounds and linear polymers (Prog. Polym. Sci. 2020, 100, 101176). Considering the unique topological structure and properties of hyperbranched polymers, the preparation of hyperbranched polymers of a new structure with AIE properties based on a new polymerization reaction is of important application value.

SUMMARY OF THE INVENTION

In order to solve the above technical problems, the present invention provides a hyperbranched polybenzene, preparation method and use thereof. A first objective of the present invention is to provide a hyperbranched polybenzene having a structural formula of:

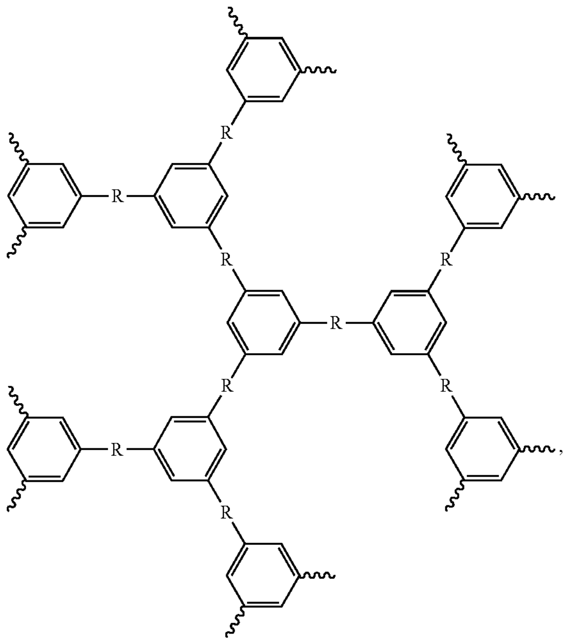

wherein R is selected from a heterocyclic group, a substituted or unsubstituted aryl group.

In an embodiment of the present invention, R is selected from the following structures:

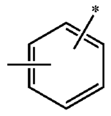

1

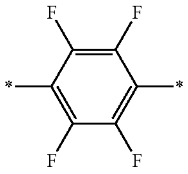

2

-continued
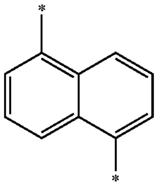
3
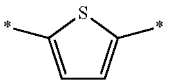
4
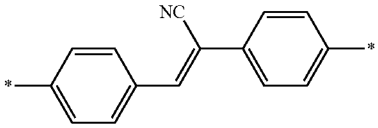
5
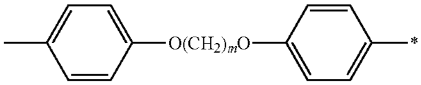
6
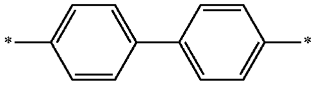
7
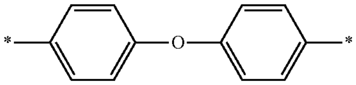
8
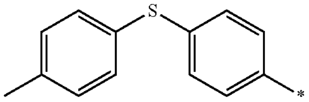
9
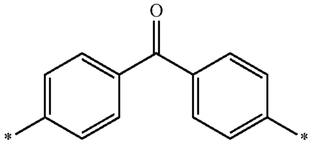
10
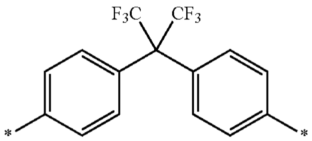
11
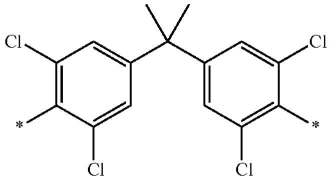
12
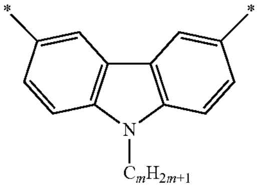
13
-continued
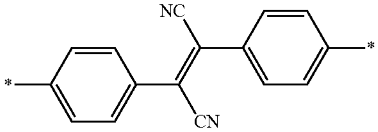
14
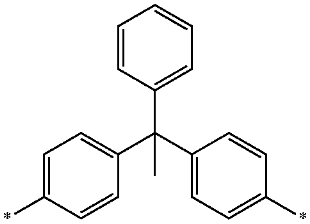
15
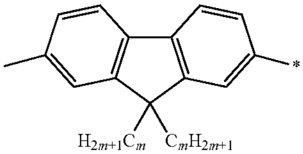
16
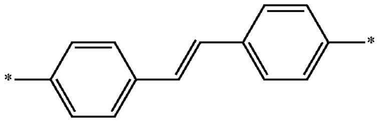
17
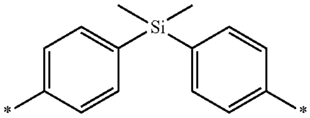
18
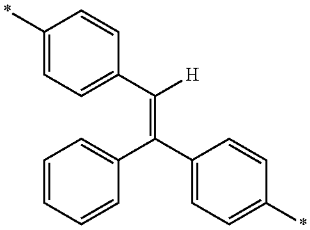
19
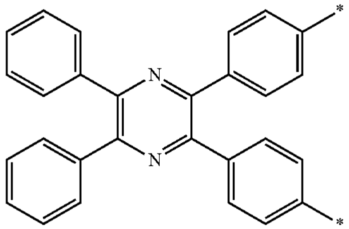
20
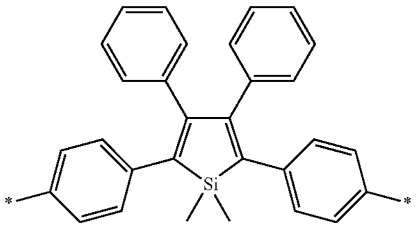
21

-continued

22

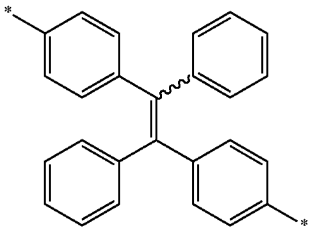

23

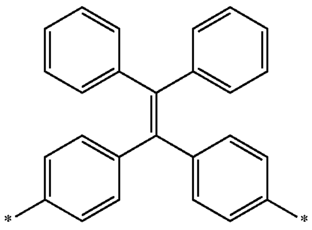

24

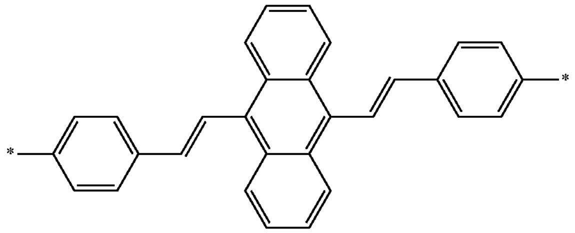

wherein m is an integer from 1 to 18; and * represents a substitution position.

A second objective of the present invention is to provide a method for preparing the hyperbranched polybenzene, including the following step: under an inert gas atmosphere, a monomer with two internal acetylenyl groups undergoes polymerization reaction in a solvent in the presence of a catalyst to obtain the hyperbranched polybenzene, wherein the monomer with two internal acetylenyl groups has a structural formula of:

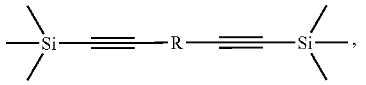

wherein R is selected from a heterocyclic group, a substituted or unsubstituted aryl group.

In an embodiment of the present invention, the monomer with two internal acetylenyl groups is obtained by a biaryl halide and trimethylsilylacetylene through Sonogashira coupling reaction; and the biaryl halide is biaryl bromide and/or biaryl iodine.

Preferably, the biaryl bromide has a structural formula of:

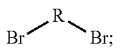

the trimethylsilylacetylene has a structural formula of:

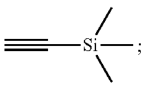

wherein R is selected from a heterocyclic group, a substituted or unsubstituted aryl group.

In an embodiment of the present invention, the catalyst is p-toluenesulfonic acid.

In an embodiment of the present invention, the solvent is one or more of 1,2,4-trichlorobenzene, o-dichlorobenzene, chlorobenzene, and toluene.

In an embodiment of the present invention, the polymerization reaction takes place at a temperature of 90° C. to 140° C. for 6 to 24 h.

Preferably, the polymerization reaction takes place at a temperature of 100° C. to 120° C. for 12 to 16 h.

In an embodiment of the present invention, the molar amount of the catalyst is 100-200% of the molar amount of the monomer with two internal acetylenyl groups.

Preferably, the molar amount of the catalyst is 100-120% of the molar amount of the monomer with two internal acetylenyl groups.

In an embodiment of the present invention, in the polymerization reaction system, the concentration of the monomer with two internal acetylenyl groups is 0.25 to 1.25 mol/L.

Preferably, in the polymerization reaction system, the concentration of the monomer with two internal acetylenyl groups is 0.75 to 1.00 mol/L.

In an embodiment of the present invention, after the polymerization reaction is completed, the method further includes separating the hyperbranched polybenzene from the reaction solution, specifically including: diluting the reaction solution by chloroform and then dripping the diluted solution into a mixed solvent of petroleum ether/chloroform (20:1, v/v) for precipitation to obtain hyperbranched polybenzene.

In an embodiment of the present invention, the method for preparing hyperbranched polybenzene specifically includes the following steps:

(1) Preparation of the Monomer with Two Internal Acetylenyl Groups

A dibromide precursor, triphenylphosphine, bis-triphenylphosphine palladium dichloride, and cuprous iodide are dissolved in a mixed solvent of tetrahydrofuran and triethylamine. Under a nitrogen atmosphere, trimethylsilylacetylene is added in batches and reacted at 75° C. for 18 to 36 h to obtain a monomer with two internal acetylenyl groups.

(2) Preparation of the Hyperbranched Polybenzene

The monomer with two internal acetylenyl groups and a p-toluenesulfonic acid hydrate are added into a container, which is vacuumed and filled with nitrogen three times. The mixture is dissolved in a solvent to prepare a mixed solution with a monomer concentration of 0.25 to 1.25 mol/L. The polymerization reaction takes place at 90° C. to 140° C. for 6 to 24 h. A polymer solution is obtained after the reaction. The polymer solution is then post-treated to obtain the hyperbranched polybenzene. The post-treatment includes diluting the polymer solution by chloroform, and dripping the diluted solution into a mixed solution of petroleum ether/chloroform (20:1, v/v) for precipitation to the obtain hyperbranched polybenzene.

The specific reaction formula of the present invention is as follows, and the polymer expands outward with the structure in the dashed circle.

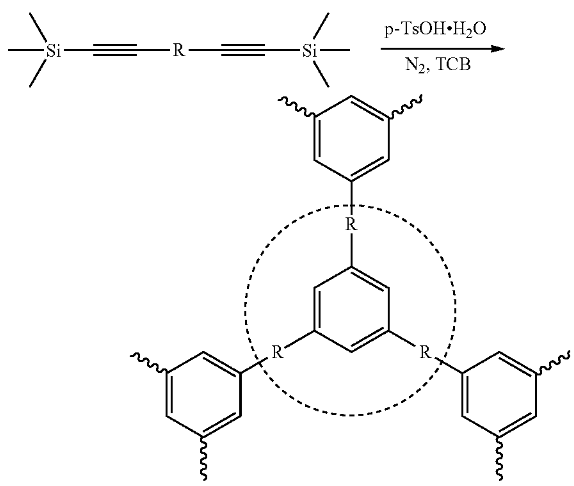

A third objective of the present invention is to provide an application of the hyperbranched polybenzene in the detection of polynitroaromatic compounds.

The technical solution of the present invention has the following advantages compared to the prior art:

(1) The reaction raw materials of the hyperbranched polybenzene of the present invention are easy to obtain and can be directly purchased or synthesized by simple reaction. No by-products are formed in the reaction process, which meets the requirements of atomic economy. The reaction has good compatibility with functional groups and can be applied to various monomers. In addition, the hyperbranched polymer also has a large number of terminal functional groups, and can be conveniently modified by introducing a variety of functional groups. Therefore, this polymerization is of important application value in the synthesis of hyperbranched polymers and the preparation of functional polymer materials.

(2) The hyperbranched polybenzene of the present invention has good solubility, can be dissolved in commonly used organic solvents such as chloroform, dichloromethane, N,N-dimethylformamide, tetrahydrofuran, and the like at room temperature, and has high thermal stability. The hyperbranched polymer with tetraphenylethylene, cyanostilbene or thiarrolic groups has AIE properties, and its fluorescence spectra overlap with the absorption spectra of polynitroaromatic compounds to a great extent, leading to fluorescence resonance energy transfer (FRET) and photoinduced electron transfer (PET). For example, such hyperbranched polymer can be used to detect polynitroaromatic explosives, and have important application prospects in preventing explosive attacks. Therefore, the present invention also discloses an application of the hyperbranched polybenzene in the detection of polynitroaromatic explosives.

(3) The monomer in the polymerization reaction is a monomer with internal acetylenyl groups, and the catalyst is a nonmetallic catalyst p-toluenesulfonic acid. The polymerization reaction has simple conditions, is convenient and environmentally friendly, and overcomes the problem that the catalyst residue caused by the use of metal catalyst in conventional cyclotrimerization reaction affects the polymer properties.

(4) Due to the typical aggregation-induced emission (AIE) group tetraphenyl ethylene, the hyperbranched polybenzene of the present invention has high fluorescence quantum yield in the aggregation state and has a fully conjugated structure, so the hyperbranched polybenzene can be used as a chemical sensor and has an application prospect for polymer light-emitting diodes.

(5) The hyperbranched polybenzene of the present invention have microporous structures and have application prospects in gas storage and catalysis.

BRIEF DESCRIPTION OF THE DRAWINGS

To make the content of the present invention more comprehensible, the present invention will be described in further detail below according to specific embodiments of the present invention and in conjunction with the accompanying drawings, wherein.

DETAILED DESCRIPTION OF THE PREFERRED EMBODIMENTS

The present invention will be further described below in conjunction with the accompanying drawings and specific embodiments, so that those skilled in the art can better understand and implement the present invention, but the embodiments described are not intended to limit the present invention.

In the present invention, only represents a molecular connection relation, unless otherwise stated.

Example 1

Figure 1:
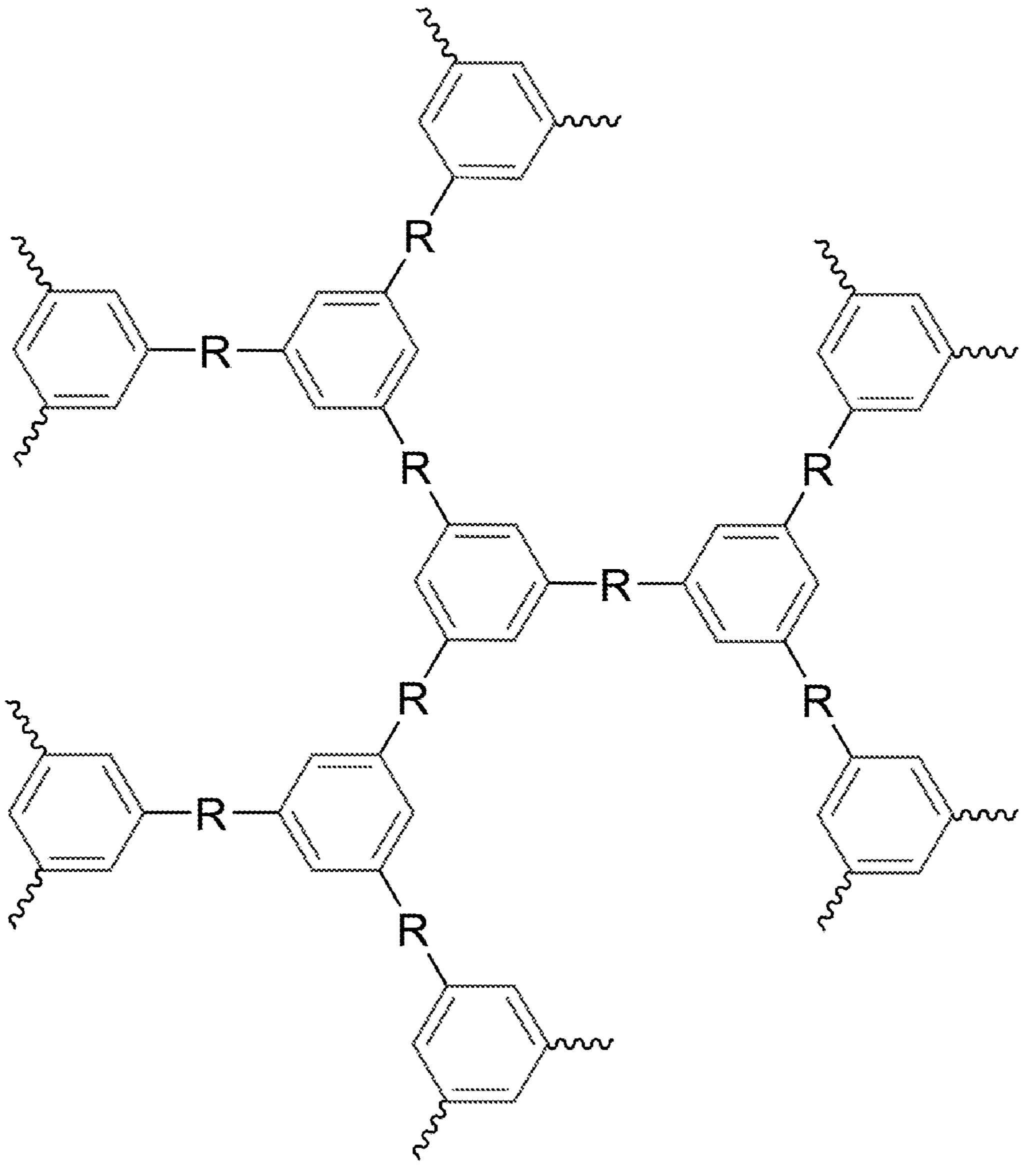
FIG. 1 is a diagram showing a structural formula of a hyperbranched polybenzene of the present invention.

Referring to FIG. 1, a hyperbranched polybenzene and its preparation method were provided. The method specifically included the following steps:

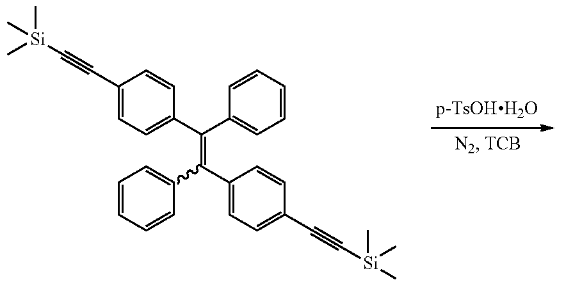

-continued

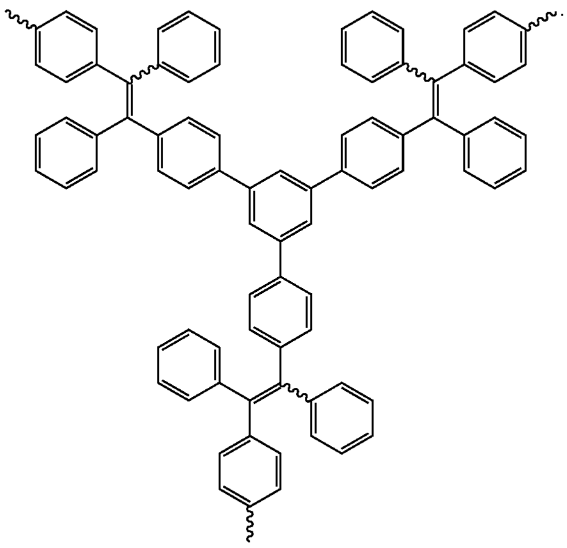

(1) Synthesis of Monomer

A 500 mL double-neck flask was filled with 4-bromobenzophenone (5.22 g, 20 mmol) and zinc powder (5.23 g, 80 mmol), vacuumed and filled with nitrogen for three times. 100 mL of freshly distilled tetrahydrofuran was added. Then titanium tetrachloride (11.38 g, 60 mmol) was slowly added at 0° C. After the temperature of the solution reached room temperature, the solution was heated to reflux overnight. Most of the solvent was removed by rotary evaporation. The residue was diluted with 100 mL of dilute hydrochloric acid, and extracted three times with dichloromethane. The product was purified by a silica gel column using petroleum ether as the eluent. The product was vacuum dried to a constant weight, to give 8.04 g of 1,4-dibromo-tetraphenylethylene white solid (with a yield of 82.2%). Then the 1,4-dibromo-tetraphenylethylene white solid (4.90 g, 10 mmol) was added to a 250 mL double-neck flask. Triphenylphosphine (0.32 g, 1.2 mmol), bis-triphenylphosphine palladium dichloride (0.28 g, 0.4 mmol), and cuprous iodide (0.15 g, 0.8 mmol) were added in sequence into the 250 mL double-neck flask, which was then vacuumed and filled with nitrogen three times. 20 mL of newly distilled tetrahydrofuran and 80 mL of triethylamine were added, stirred to dissolve, and transferred to an oil bath at 75° C. Trimethylsilylacetylene (4.32 g, 40 mmol) was added in three batches. After 24 h of reaction, the insoluble solids were removed by suction filtration. The crude product was purified by a silica gel column using petroleum ether/ethyl acetate (200:1, v/v) as the eluent. The product was vacuum dried to a constant weight to give 4.45 g of light green solid (with a yield of 85.0%). $^1$H NMR (300 MHz, $CD_2Cl_2$), δ (TMS, ppm): 7.26-6.85 (m, 18H), 0.28-0.14 (d, J=3.0 Hz, 18H).

(2) Preparation of Polymer 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 82.4%. The results of gel permeation chromatography (GPC) showed that: the weight average molecular weight ($M_W$) was 26800, and the molecular weight distribution (PDI) was 3.40. $^1$H NMR (300 MHz, $CD_2Cl_2$), δ (TMS, ppm): 7.68, 7.50, 7.12, 2.50.

Figure 2:
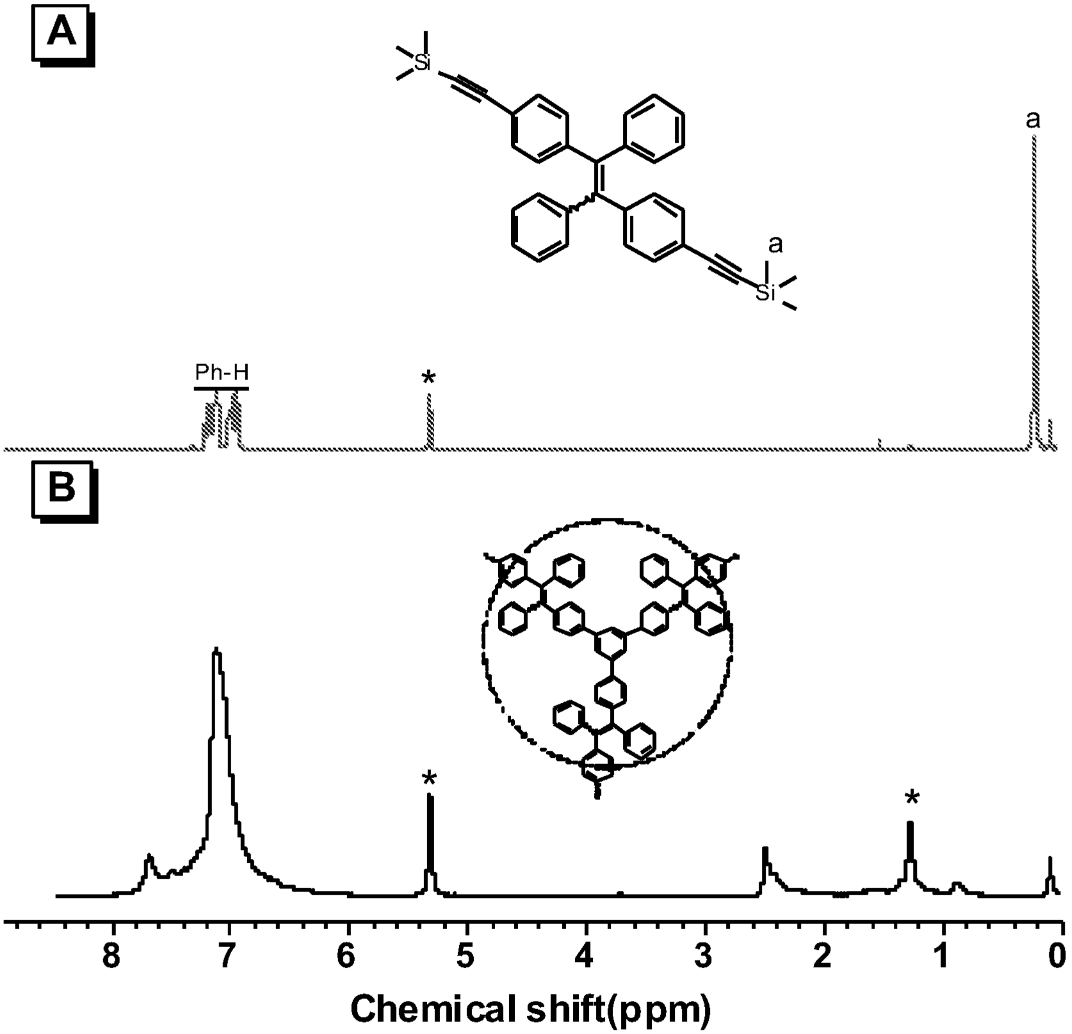
FIG. 2 shows $^1H$ NMR spectra of hyperbranched polybenzene and its corresponding monomer prepared in Example 1 of the present invention in $CD_2Cl_2$ (where "*" represents solvent peak)

A comparison of $^1$H NMR spectra of the polymer and its corresponding monomer was as shown in FIG. 2. It can be determined from the figure that the polymer is hyperbranched polybenzene. The formant of the monomer at δ 0.24 corresponds to the methyl hydrogen of its trimethyl silicon, but it disappears in the NMR spectrum of the polymer, indicating the occurrence of the polymerization reaction. Moreover, the polymer structure obtained by the polymerization reaction was a single 1,3,5-trisubstituted hyperbranched polybenzene, which can be further proved by δ 7.68 and δ 7.50, indicating that the polymerization reaction has region specificity. In addition, the degree of branching of the polymer calculated from the peak area in NMR spectra was 0.64, higher than those of conventional hyperbranched polymers (which are usually about 0.5) (*Macromolecules* 1997, 30, 7024-7033), indicating that the polymer has a highly branched structure.

Figure 3:
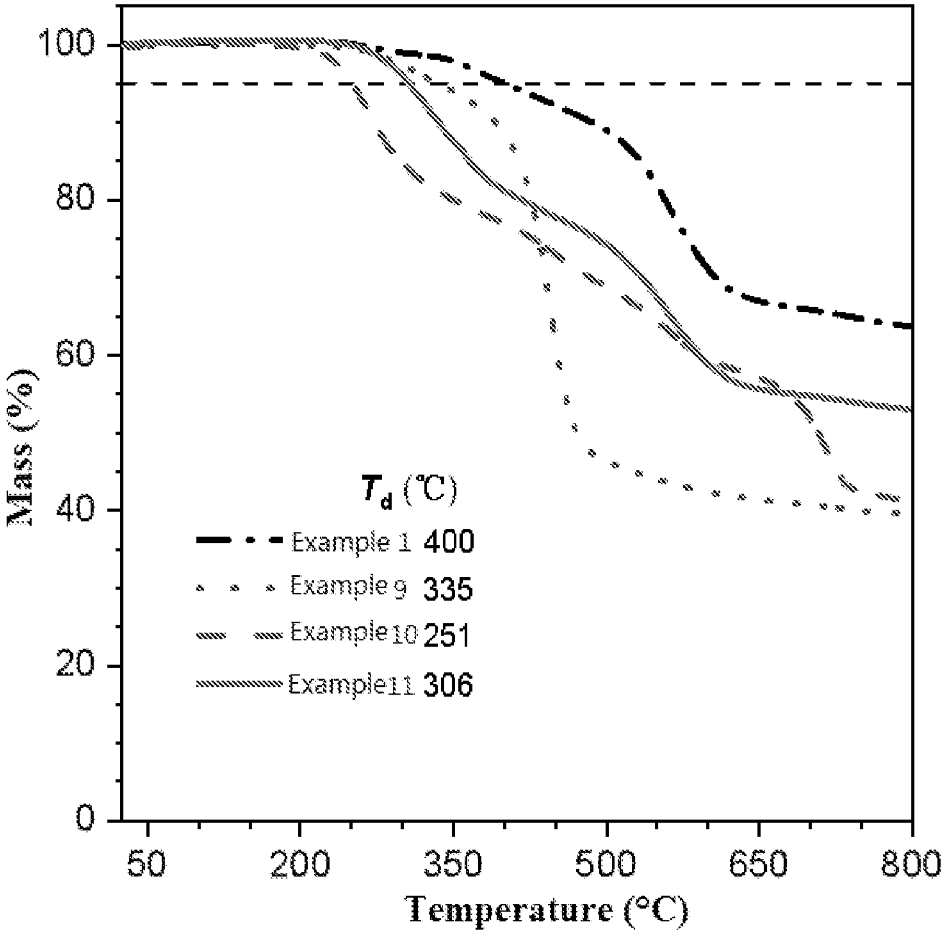
FIG. 3 is a thermogravimetric graph of hyperbranched polybenzene prepared in Examples 1, 9, 10, and 11 respectively under test conditions including a nitrogen atmosphere and a heating rate of 10° C./min.

The prepared polymer had good solubility, and was soluble at room temperature in commonly used organic solvents such as dichloromethane, tetrahydrofuran, N,N-dimethylformamide. In addition, the thermogravimetric analysis showed that its 5% mass loss temperature was 400° C., indicating that it had good thermal stability, as shown in FIG. 3.

Example 2

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 13 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 84.0%. The results of gel permeation chromatography (GPC) showed that: the weight average molecular weight ($M_W$) was 25500, and the molecular weight distribution (PDI) was 3.30.

Example 3

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 9 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 57.9%. The results of gel permeation chromatography (GPC) showed that: the weight average molecular weight ($M_W$) was 12800, and the molecular weight distribution (PDI) was 2.34.

Example 4

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 110° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 55.2%. The results of gel permeation chromatography (GPC) showed that: the weight average molecular weight ($M_W$) was 3200, and the molecular weight distribution (PDI) was 1.21.

Example 5

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.20 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 57.9%. The results of gel permeation chromatography (GPC) showed that: the weight average molecular weight ($M_W$) was 2800, and the molecular weight distribution (PDI) was 1.15.

Example 6

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.08 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 78.9%. The results of gel permeation chromatography (GPC) showed that: the weight average molecular weight ($M_W$) was 19000, and the molecular weight distribution (PDI) was 1.21.

Example 7

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 57.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 94.7%. The results of gel permeation chromatography (GPC) showed that: the weight average molecular weight ($M_W$) was 10300, and the molecular weight distribution (PDI) was 1.85.

Example 8

A hyperbranched polybenzene and its preparation method were provided. The method specifically included the following steps:

The preparation of the monomer with two internal acetylenyl groups was the same as that in Example 1. 52.4 mg (0.10 mmol) of tetraphenylethylene-containing monomer with two internal acetylenyl groups and 76.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 84.2%. The results of gel permeation chromatography (GPC) showed that: the weight average molecular weight ($M_W$) was 5100, and the molecular weight distribution (PDI) was 1.38.

Example 9

A hyperbranched polybenzene and its preparation method were provided. The method specifically included the following steps:

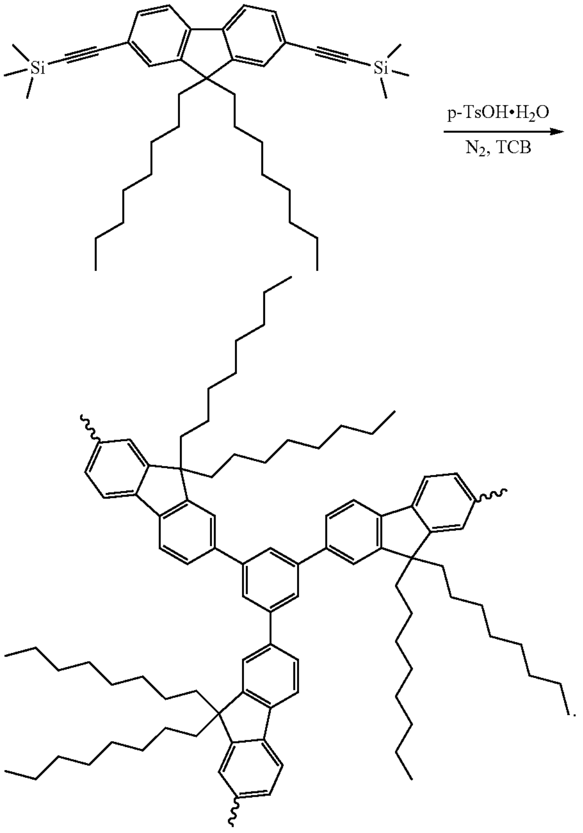

(1) Preparation of Monomer 5.07 g (30 mmol) of fluorene was added to a 250 mL double-neck flask, followed by the addition of a mixture (100 mL) of acetic acid, water, and concentrated sulfuric acid (100:20:3, v/v/v). The reaction mixture was heated to reflux (about 140° C.) and the solids are completely dissolved. The solution was then cooled to 65° C., and 6.38 g (25 mmol) of iodine and 2.91 g (12.5 mmol) of iodic acid were added. The solution was stirred at 65° C. for 4 h and then cooled to room temperature. The reaction mixture was extracted with dichloromethane and the collected organic layer was washed with a solution of sodium carbonate and sodium thiosulfate. The residue was recrystallized in ethyl acetate and dried to obtain 3.6 g of slightly yellow powder 2,7-diiodo-fluorene (with a yield of 90.6%). 2.11 g (5 mmol) of 2,7-diiodo-fluorene and 50 mL of DMSO were added to a 250 mL double-neck round-bottom flask. 1.44 g (7.5 mmol) of 1-bromooctane was added. After being stirred overnight at room temperature, the reaction mixture was neutralized with hydrochloric acid (1 M) until the solution turned pale yellow. Then the solution was extracted with ether. After the solvent evaporated, the crude product was purified by a silica gel column. 1.84 g of slightly yellow solid was obtained (with a yield of 50.2%). 2,7-diiodo-9,9-dioctyl-fluorene (6.42 g, 10 mmol) was successively added to a 250 mL double-neck flask. Triphenylphosphine (0.32 g, 1.2 mmol), bis-triphenylphosphine palladium dichloride (0.28 g, 0.4 mmol), and cuprous iodide (0.15 g, 0.8 mmol) were added in sequence into the 250 mL double-neck flask, which was then vacuumed and filled with nitrogen three times. 20 mL of newly distilled tetrahydrofuran and 80 mL of triethylamine were added, stirred to dissolve, and transferred to an oil bath at 75° C. Trimethylsilylacetylene (4.32 g, 40 mmol) was added in three batches. After 24 h of reaction, the insoluble solids were removed by suction filtration. The product was purified by a silica gel column using petroleum ether as the eluent. The product was vacuum dried to a constant weight, to give 3.91 g of white solid (with a yield of 67.6%). $^1H$ NMR (300 MHz, $CD_2Cl_2$), δ (TMS, ppm): 7.67-7.59 (d, J=8.1 Hz, 2H), 7.48-7.39 (t, J=3.7 Hz, 4H), 2.02-1.90 (m, 4H), 1.27-0.99 (m, 24H), 0.87-0.77 (t, J=6.9 Hz, 6H), 0.30-0.24 (s, 18H).

(2) Preparation of Polymer 58.3 mg (0.10 mmol) of fluorene monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 21 h. After the reaction, the system was cooled to room temperature, diluted with 3 mL of chloroform, and added dropwise through a cotton-stuffed dropper to 150 mL of conventionally stirred petroleum ether. The solution was allowed to stand and filtered. The obtained product was washed with sodium bicarbonate and dried at room temperature to a constant weight. Characterization data: yellow solid with a yield of 60.0%. The results of gel permeation chromatography (GPC) showed that: the weight average molecular weight ($M_W$) was 22969, and the molecular weight distribution (PDI) was 1.52. $^1H$ NMR (300 MHz, $CD_2Cl_2$), δ (TMS, ppm): 8.25-7.38, 2.66, 2.12, 1.11, 0.78.

As shown in FIG. 3, the thermogravimetric analysis showed that its 5% mass loss temperature was 335° C., indicating that it had good thermal stability.

Example 10

A hyperbranched polybenzene and its preparation method were provided. The method specifically included the following steps:

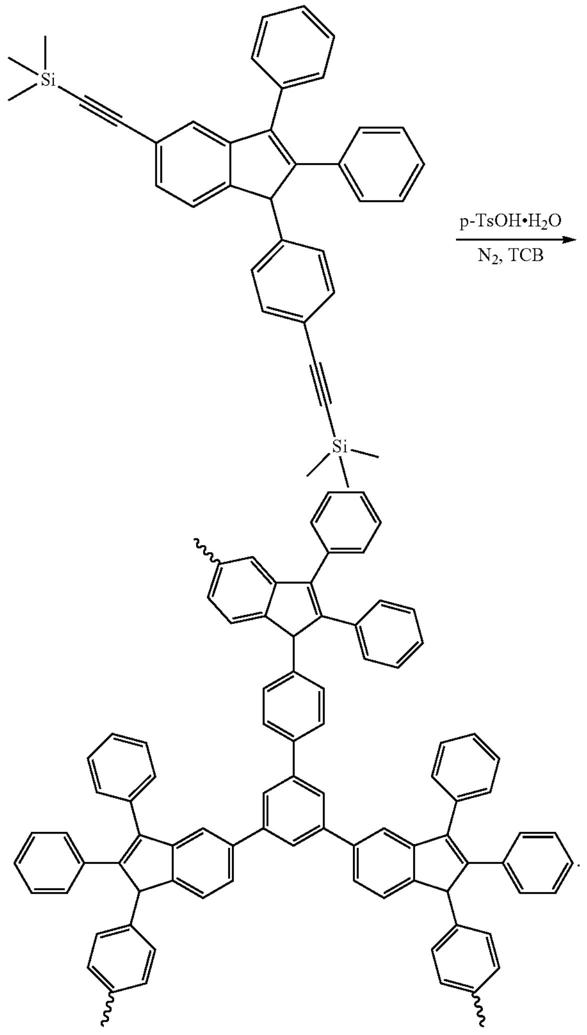

(1) Preparation of Monomer 3.40 g (10 mmol) of 4,4'-dibromobenzophenone was added to a 50 mL single-neck round-bottom flask. 33 mL of a mixture of methanol and tetrahydrofuran (1:10, v/v) was added. 0.76 g (20 mmol) of sodium borohydride was added at 0° C. After 3 h of reaction, the reaction solution was quench with water, extracted with ethyl acetate, and dried to obtain 3.42 g of 4,4'-dibromodibenzyl alcohol, which was a white solid (with a yield of 100%). 3.42 g (10 mmol) of 4,4'-dibromobenzyl alcohol was added to a 100 mL double-neck round bottom flask, which was vacuumed and filled with nitrogen for three times. 40 mL of newly prepared dichloromethane was added. Then the flask was put into an ice water bath, followed by slow introduction of 2.08 g (11 mmol) of titanium tetrachloride. After the temperature of the solution reached room temperature, the solution was reacted overnight. The product was purified by a gel column using petroleum ether as the eluent. The product was vacuum dried to a constant weight, to give 3.62 g of white solid (with a yield of 67.6%). The white solid (5.02 g, 10 mmol) was added into a 250 mL double-neck flask. Triphenylphosphine (0.32 g, 1.2 mmol), bis-triphenylphosphine palladium dichloride (0.28 g, 0.4 mmol), and cuprous iodide (0.15 g, 0.8 mmol) were added in sequence into the 250 mL double-neck flask, which was then vacuumed and filled with nitrogen three times. 20 mL of newly distilled tetrahydrofuran and 80 mL of triethylamine were added, stirred to dissolve, and transferred to an oil bath at 75° C. Trimethylsilylacetylene (4.32 g, 40 mmol) was added in three batches. After 24 h of reaction, the insoluble solids were removed by suction filtration. The product was purified by a silica gel column using petroleum ether as the eluent. The product was vacuum dried to a constant weight, to give 3.73 g of white solid (with a yield of 69.5%). $^1H$ NMR (300 MHz, $CD_2Cl_2$), δ (TMS, ppm):7.56-7.47 (d, J=7.9 Hz, 2H), 7.42-7.24 (m, 4H), 7.24-7.08 (m, 11H), 5.17-5.11 (s, 1H), 0.30-0.24 (s, 7H), 0.24-0.18 (s, 9H), 0.12-0.06 (s, 2H).

(2) Preparation of Polymer 53.6 mg (0.10 mmol) of indene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 80.0%. The results of gel permeation chromatography (GPC) showed that: the weight average molecular weight ($M_w$) was 14600, and the molecular weight distribution (PDI) was 3.0. $^1H$ NMR (300 MHz, $CD_2Cl_2$), δ (TMS, ppm): 8.0-6.9, 5.25, 2.53.

As shown in FIG. 3, the thermogravimetric analysis showed that its 5% mass loss temperature was 251° C., indicating that it had good thermal stability.

Example 11

A hyperbranched polybenzene and its preparation method were provided. The method specifically included the following steps:

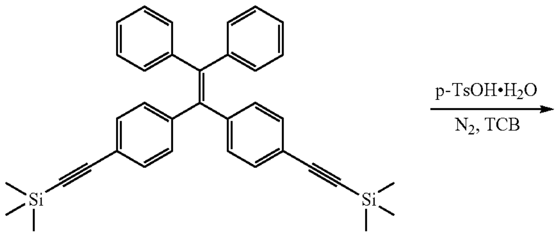

-continued

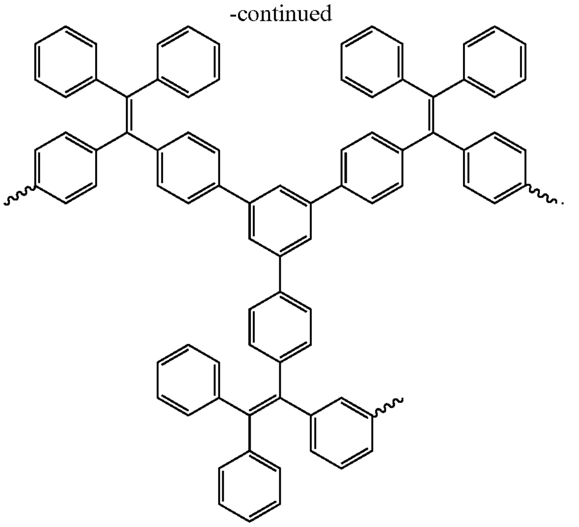

(1) Preparation of Monomer 2.02 g (12 mmol) of 1,2-diphenylmethane was added to a 250 mL double-neck flask, which was vacuumed and filled with nitrogen for three times. 50 mL of freshly distilled tetrahydrofuran was added. 6.9 mL (11 mmol) of n-butyl lithium was added at −78° C. After reaching room temperature, the solution reacted for 30 min, 3.40 g (10 mmol) of 1,2-dibromobenzophenone was dissolved in tetrahydrofuran and then added to the system. The system reacted overnight at room temperature, treated with saturated ammonium chloride solution, extracted with dichloromethane three times, and dried over anhydrous magnesium sulfate. The product was vacuum dried to a constant weight, to give 5.03 g of α,α-bis(4-bromophenyl)-β-phenylphenethanol white solid (with a yield of 98.9%). 5.08 g (10 mmol) of α,α-bis (4-bromophenyl)-β-phenylphenethanol was added to a 500 mL double-neck flask equipped with an oil-water separator. 0.285 g (1.5 mmol) of p-toluenesulfonic acid was added. 75 mL of toluene was added. The solution was refluxed overnight at 130° C. The solvent was rotary dried. The product was purified by a gel column using petroleum ether as the eluent. The product was vacuum dried to a constant weight, to give 1.98 g of dibromotetraphenylethylene white solid (with a yield of 40.5%). Dibromotetraphenylethylene (6.42 g, 10 mmol) was added to a 250 mL double-neck flask. Triphenylphosphine (0.32 g, 1.2 mmol), bis-triphenylphosphine palladium dichloride (0.28 g, 0.4 mmol), and cuprous iodide (0.15 g, 0.8 mmol) were added in sequence into the 250 mL double-neck flask, which was then vacuumed and filled with nitrogen three times. 20 mL of newly distilled tetrahydrofuran and 80 mL of triethylamine were added, stirred to dissolve, and transferred to an oil bath at 75° C. Trimethylsilylacetylene (4.32 g, 40 mmol) was added in three batches. After 24 h of reaction, the insoluble solids were removed by suction filtration. The product was purified by a silica gel column using petroleum ether as the eluent. The product was vacuum dried to a constant weight, to give 3.53 g of white solid (with a yield of 67.5%). $^1$H NMR (300 MHz, $CD_2Cl_2$), δ (TMS, ppm): 7.24-6.87 (m, 18H), 0.25-0.19 (s, 18H).

(2) Preparation of Polymer 52.4 mg (0.10 mmol) of tetraphenylethylene-containing monomer with two internal acetylenyl groups and 38.0 mg (0.10 mmol) of p-toluenesulfonic acid hydrate were added into a 10 mL polymerization tube with a side arm. The polymerization tube was vacuumed and filled with $N_2$ through the side arm for three times. 0.1 mL of 1,2,4-trichlorobenzene was added, and stirred to dissolve. The system was reacted at 60° C. for 3 h and then at 120° C. for 12 h. After the reaction, the system was cooled to room temperature, diluted with 3 mL of chloroform, and added dropwise through a cotton-stuffed dropper to 150 mL of a conventionally stirred mixed solvent of petroleum ether/chloroform (20:1, v/v). The solution was allowed to stand and filtered. The obtained product was washed with sodium bicarbonate and dried at room temperature to a constant weight. Characterization data: yellow solid with a yield of 87.0%. The results of gel permeation chromatography (GPC) showed that: the weight average molecular weight ($M_W$) was 32200, and the molecular weight distribution (PDI) was 2.36. $^1$H NMR (300 MHz, $CD_2Cl_2$), δ (TMS, ppm): 7.68, 7.51, 7.12, 2.50.

As shown in FIG. 3, the thermogravimetric analysis showed that its 5% mass loss temperature was 306° C., indicating that it had good thermal stability.

Application Example

Figure 4:
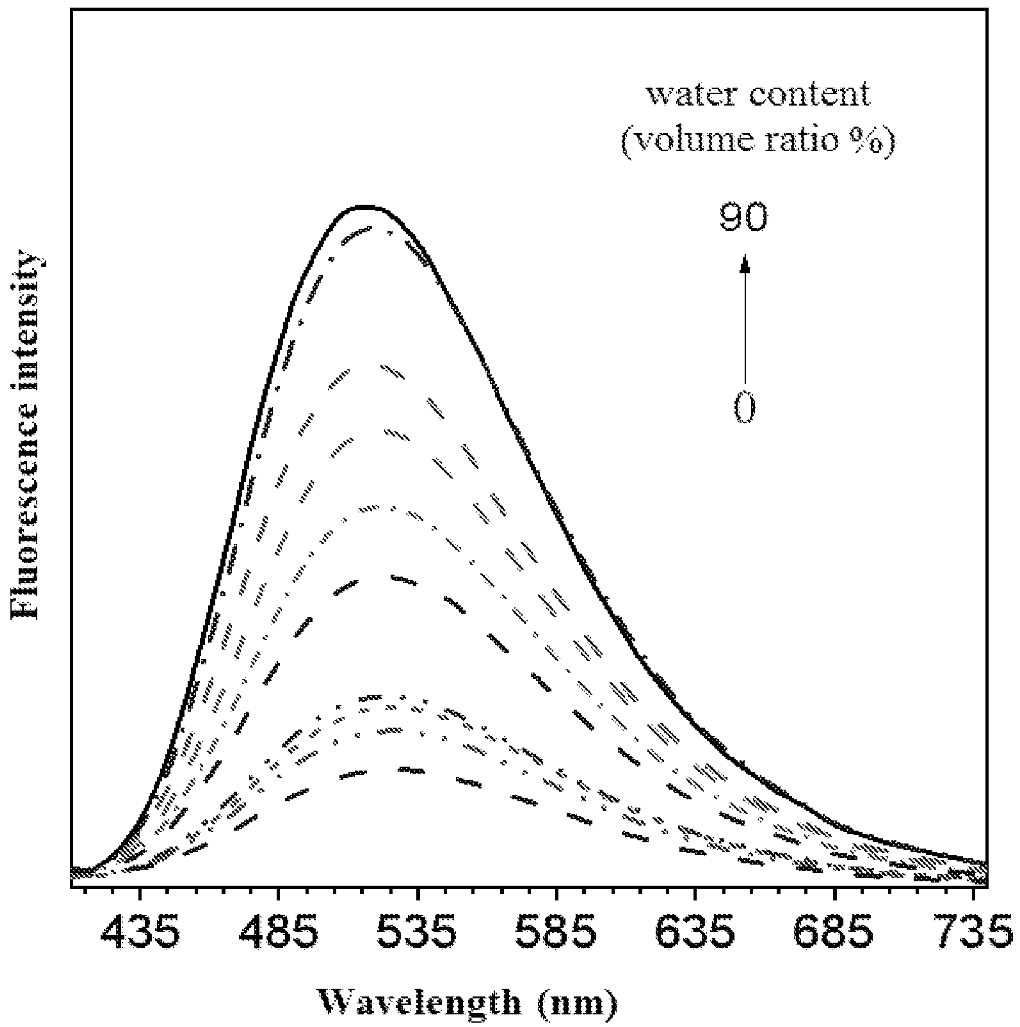
FIG. 4 is an AIE graph of the hyperbranched polybenzene prepared in Example 1 of the present invention.

The polymer of the present invention exhibited weak luminescence in THF solution, and remarkably enhanced fluorescence after the addition of a poor solvent (water), indicating that the polymer has AIE performance. The polymer of Example 1 was used as an example. A series of $10^{-5}$ mol/L solutions of the hyperbranched polybenzene in tetrahydrofuran/water were formulated, with the water content controlled to be 0 to 90%. Fluorescence spectra were rapidly tested. The results are as shown in FIG. 4. The fluorescence intensity of the polymer increased obviously with the increase of the water content, exhibiting obvious AIE properties.

Figure 5:
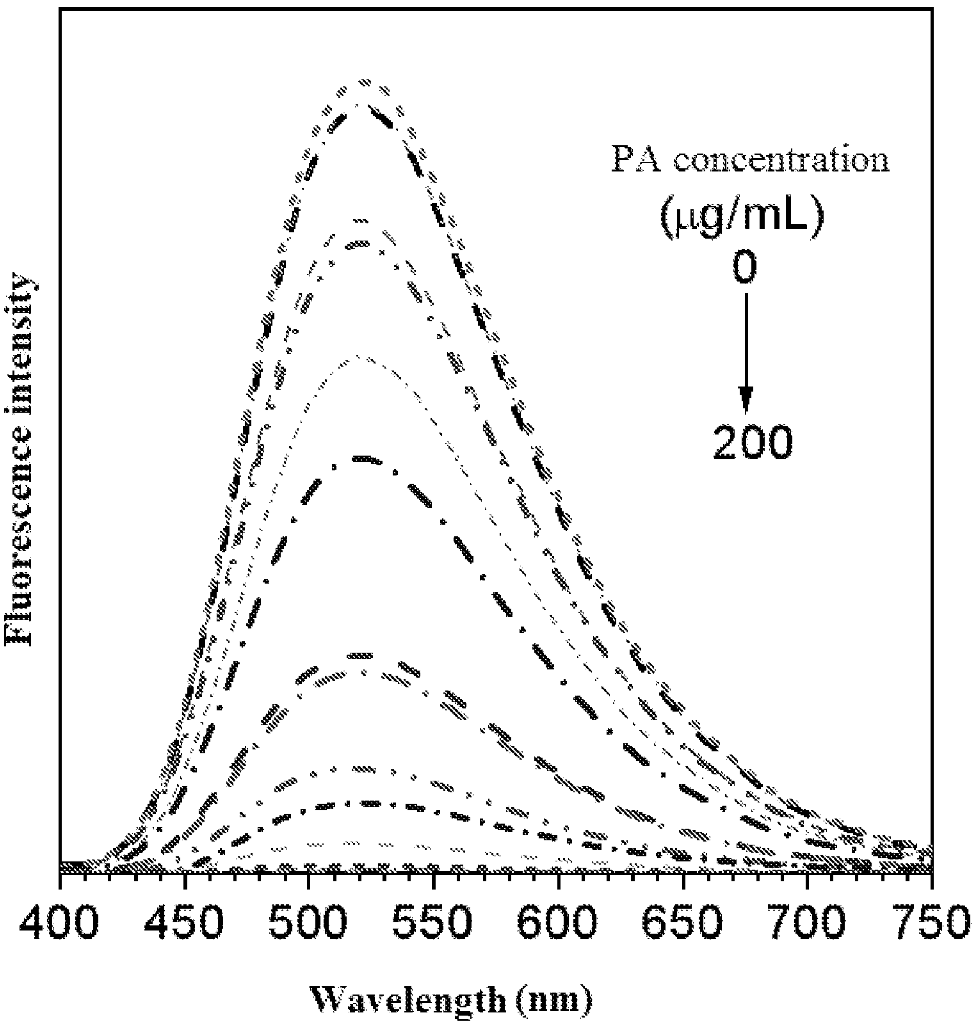
FIG. 5 shows fluorescence spectra of detecting picric acid (PA) using the hyperbranched polybenzene prepared in Example 1 of the present invention in the aggregated state.

The polymer of the present invention having the AIE performance can be used for the detection of nitroaromatic explosives. Taking the polymer of Example 10 as an example, the specific experiment was the same as that in the prior art. The specific process was as follows: Picric acid (PA) was used as a model explosive. The process of detecting PA was as follows. Firstly, $10^{-5}$ mol/L solutions of the hyperbranched polybenzene in tetrahydrofuran/water were prepared as test samples (where the volume fraction of water was 90%). The to-be-detected substance PA was added respectively to the test samples, so that the PA concentrations were 0.2, 0.5, 1.0, 2.0, 5.0, 10, 20, 30, 50, 80, 100, 120, 150, and 200 μg/mL respectively. Fluorescence spectra were rapidly tested. The results were as shown in FIG. 5. When no PA was added, the fluorescences of the test samples were very strong. When PA was added, the fluorescences decreased, and with the increase of the PA content, the fluorescences decreased gradually. The fluorescence decrease was observed when the PA concentration was 0.2 μg/mL. The fluorescence quenching constant was 25266 $M^{-1}$ for the PA concentration ranging from 0 to 30 μg/mL, indicating a high sensitivity for PA detection. It showed that the hyperbranched polybenzene of the present invention can be used as a sensor to detect nitroaromatic explosives.

Apparently, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A method for preparing the hyperbranched polybenzene having a structural formula of

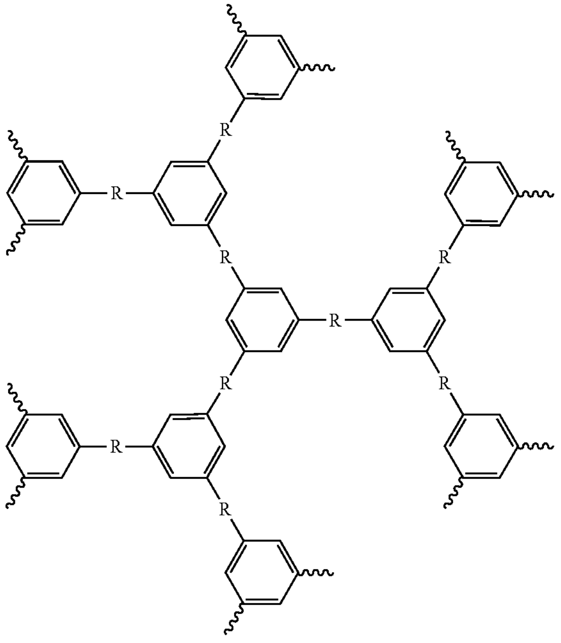

including: under an inert gas atmosphere, a monomer with two internal acetylenyl groups undergoing polymerization reaction in a solvent in the presence of a catalyst to obtain the hyperbranched polybenzene, wherein the monomer with two internal acetylenyl groups has a structural formula of:

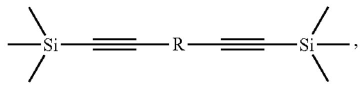

wherein R is selected from a heterocyclic group, a substituted or unsubstituted aryl group.

2. The method for preparing hyperbranched polybenzene according to claim 1, wherein the monomer with two internal acetylenyl groups is obtained by a biaryl halide and trimethylsilylacetylene through Sonogashira coupling reaction; and the biaryl halide is biaryl bromide and/or biaryl iodine.

3. The method for preparing hyperbranched polybenzene according to claim 1, wherein the catalyst is p-toluenesulfonic acid.

4. The method for preparing hyperbranched polybenzene according to claim 1, wherein the solvent is one or more of 1,2,4-trichlorobenzene, o-dichlorobenzene, chlorobenzene, and toluene.

5. The method for preparing hyperbranched polybenzene according to claim 1, wherein the polymerization reaction takes place at a temperature of 90° C. to 140° C. for 6 to 24 h.

6. The method for preparing hyperbranched polybenzene according to claim 1, wherein the molar amount of the catalyst is 100-200% of the molar amount of the monomer with two internal acetylenyl groups.

7. The method for preparing hyperbranched polybenzene according to claim 1, wherein in the polymerization reaction system, the concentration of the monomer with two internal acetylenyl groups is 0.25 to 1.25 mol/L.

* * * * *